US010901655B2

(12) United States Patent
Vishne et al.

(10) Patent No.: US 10,901,655 B2
(45) Date of Patent: Jan. 26, 2021

(54) NON-VOLATILE STORAGE SYSTEM WITH COMMAND RESPONSE PIGGYBACKING

(71) Applicant: WESTERN DIGITAL TECHNOLOGIES, INC., San Jose, CA (US)

(72) Inventors: Gadi Vishne, Petach-Tikva (IL); Michal Silbermintz, Tel Mond (IL)

(73) Assignee: Western Digital Technologies, Inc., San Jose, CA (US)

( * ) Notice: Subject to any disclaimer, the term of this patent is extended or adjusted under 35 U.S.C. 154(b) by 89 days.

(21) Appl. No.: 16/143,963

(22) Filed: Sep. 27, 2018

(65) Prior Publication Data
US 2020/0104070 A1    Apr. 2, 2020

(51) Int. Cl.
*G06F 3/06* (2006.01)
*G06F 13/16* (2006.01)
*G06F 13/42* (2006.01)

(52) U.S. Cl.
CPC .......... *G06F 3/0659* (2013.01); *G06F 3/0604* (2013.01); *G06F 3/0679* (2013.01); *G06F 13/1668* (2013.01); *G06F 13/4282* (2013.01); *G06F 2213/0026* (2013.01)

(58) Field of Classification Search
CPC .... G06F 3/0659; G06F 3/0604; G06F 3/0679; G06F 13/1668; G06F 13/4282; G06F 2213/0026
See application file for complete search history.

(56) References Cited

U.S. PATENT DOCUMENTS

| | | | |
|---|---|---|---|
| 5,655,102 A | 8/1997 | Galles | |
| 7,254,690 B2 | 8/2007 | Rao | |
| 7,454,586 B2 | 11/2008 | Shi et al. | |
| 7,987,437 B2 | 7/2011 | Drerup et al. | |
| 8,244,994 B1 | 8/2012 | Yearsley | |
| 9,361,985 B2 | 6/2016 | Kim et al. | |
| 9,389,952 B2 | 7/2016 | Yu et al. | |
| 9,477,617 B2 | 10/2016 | Lasan et al. | |
| 2010/0128739 A1* | 5/2010 | Jung | H04L 12/2801 370/458 |
| 2011/0167184 A1* | 7/2011 | Suzuki | G06F 13/4243 710/107 |
| 2016/0162219 A1* | 6/2016 | Erez | G06F 3/0653 711/103 |
| 2017/0060429 A1* | 3/2017 | Gupta | G11C 11/4096 |
| 2017/0177044 A1* | 6/2017 | Limaye | G06F 1/206 |

(Continued)

OTHER PUBLICATIONS

Strass, Hermann, "An Introduction to NVMe," Technology Paper, May 2016, 8 pages.

(Continued)

*Primary Examiner* — Henry Tsai
*Assistant Examiner* — John B Roche
(74) *Attorney, Agent, or Firm* — Vierra Magen Marcus LLP

(57) ABSTRACT

A non-volatile memory die includes a plurality of non-volatile memory cells and die control circuitry. The die control circuitry is configured to respond to a received command to access the plurality of non-volatile memory cells by sending a response indicated by the received command together with die variable information. The die variable information includes information not indicated by the received command.

20 Claims, 14 Drawing Sheets

(56) References Cited

U.S. PATENT DOCUMENTS

2017/0262228 A1 9/2017 Cann
2017/0300263 A1 10/2017 Helmick
2018/0095807 A1* 4/2018 Wu .................. H04M 1/72522

OTHER PUBLICATIONS

NVM Express, "NVM Express," Rev. 1.3, May 1, 2017, 282 pages.
Huffman, Amber, "NVM Express: Optimized Interface for PCI Express* SSDs," Intel, IDF 13, Sep. 2013, 58 pages.
Sandisk, "Native Command Queuing (NCQ) defined," downloaded from https://kb.sandisk.com/app/answers/detail/a_id/8146/~/native-command-queuing-(ncq)-defined, Sep. 2017, 2 pages.
NVM Express, "NVMe Overview," Aug. 2016, 5 pages.
Snia, "Solid State Storage Initiative—An Overview of Standards, Markets and Performance," PCIe SSD 101, Aug. 2013, 32 pages.
Jung, Myoungsoo, et al., "Sprinkler: Maximizing Resource Utilization in Many-Chip Solid State Disks," Dept. of EECS, Pennsylvania State University, arXiv:1705.04627v1 [cs.AR], May 12, 2017, 15 pages.

* cited by examiner

NON-VOLATILE STORAGE SYSTEM WITH COMMAND RESPONSE PIGGYBACKING

BACKGROUND

Many electronic devices make use of memory systems. Often, the memory system includes non-volatile memory such as flash memory. An electronic device that includes a memory system, or is connected to a memory system, is often referred to as a host.

A memory system that includes semiconductor memory may be in communication with a host through an interface. In some cases, more than one data storage device may be in communication with a host system through one or more interfaces.

A memory system that includes semiconductor memory may include one or more non-volatile memory dies that are in communication with a controller. For example, a memory bus may connect non-volatile memory dies with a controller in a memory system.

BRIEF DESCRIPTION OF THE DRAWINGS

Like-numbered elements refer to common components in the different figures.

DETAILED DESCRIPTION

In some cases, where a controller is connected to one or more non-volatile memory dies (e.g. through a bus, such as a Toggle Mode bus), the non-volatile memory dies may send die variable information to the controller for use in managing the non-volatile memory dies. For example, non-volatile memory dies may send die temperature information to a controller and the controller may modify operations accordingly to account for changing temperature. In some cases, a controller may send a command to a non-volatile memory die requesting die variable information. In response, the non-volatile memory die may send the requested die variable information back to the controller. In some cases, such commands and replies may represent significant traffic on a memory bus and may significantly reduce the available capacity of such a memory bus (e.g. where temperature is requested and sent repeatedly by one or more non-volatile memory dies).

According to some examples presented here, a non-volatile memory die may be configured to send die variable information to a controller together with a response to a die access command (e.g. with a response to a read or write command). Thus, instead of separately sending die variable information in a dedicated response to a dedicated command from a controller, die variable information may be piggybacked with responses to other commands. In some cases, such piggybacked die variable information may be sent by a non-volatile memory die more than once with responses to multiple die access commands without separate commands from the controller. Thus, a controller may send an initialization command to tell a non-volatile memory die to start piggybacking die variable information and in response the non-volatile memory die may send the die variable information with responses to some or all subsequently received die access commands. This may continue for a fixed number of commands that may be specified by the controller (or may continue indefinitely) so that temperature, or other die variable, may be updated repeatedly without creating unnecessary bus traffic.

Figure 1:
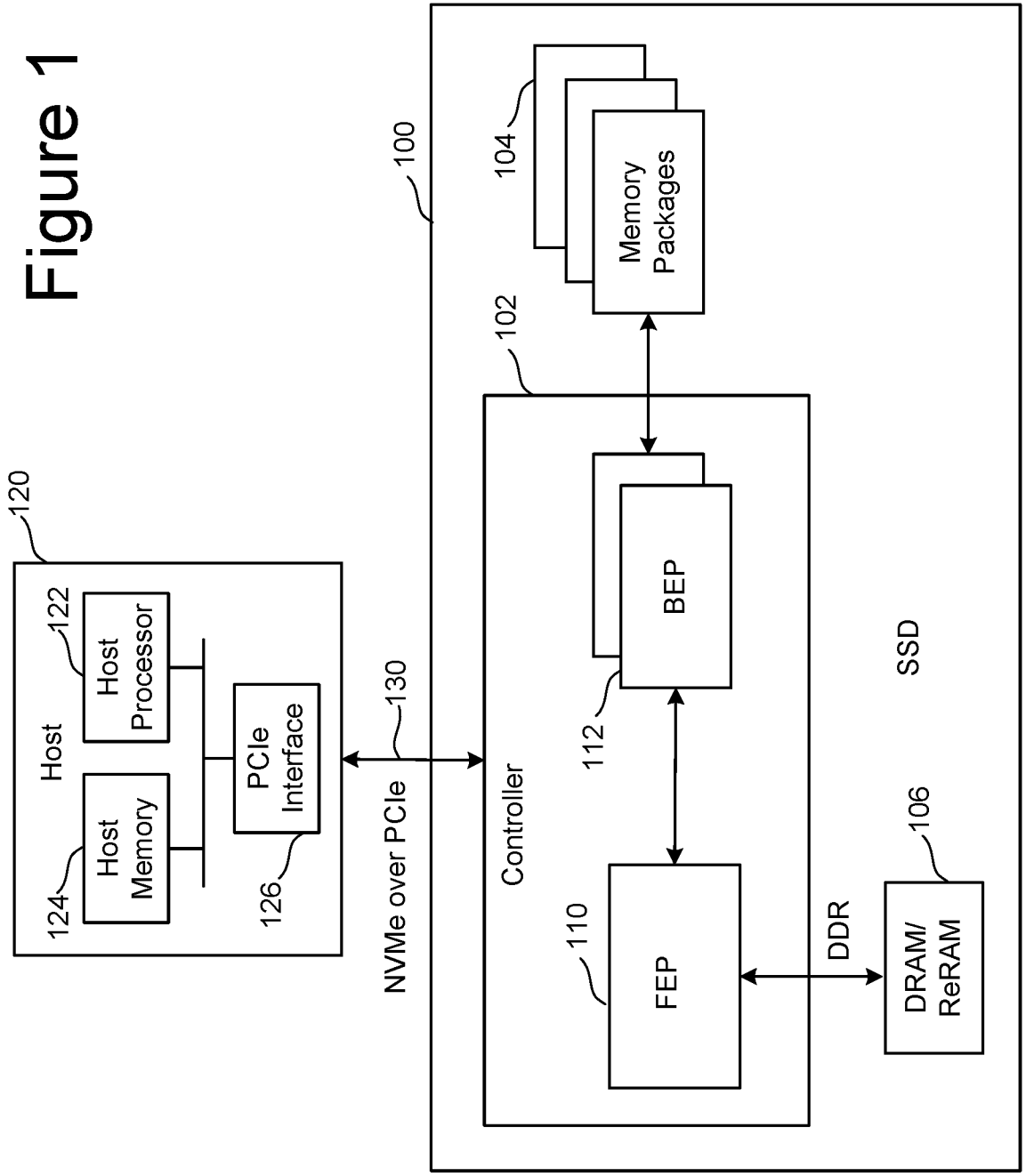
FIG. 1 is a block diagram of one embodiment of a memory system connected to a host.

FIG. 1 is a block diagram of one embodiment of a memory system 100 connected to a host 120. Memory system 100 can implement the technology proposed herein. Many different types of memory systems can be used with the technology proposed herein. One example memory system is a solid state drive ("SSD"). Memory system comprises a Controller 102, non-volatile memory 104 for storing data, and local memory (e.g. DRAM/ReRAM) 106. Controller 102 comprises a Front End Processor Circuit (FEP) 110 and one or more Back End Processor Circuits (BEP) 112. In one embodiment FEP 110 circuit is implemented on an ASIC. In one embodiment, each BEP circuit 112 is implemented on a separate ASIC. The ASICs for each of the BEP circuits 112 and the FEP circuit 110 are implemented on the same semiconductor such that the Controller 102 is manufactured as a System on a Chip ("SoC"). FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory packages/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the interfaces to the memory packages (e.g. Toggle Mode interfaces), etc. In one embodiment, each BEP circuit 112 is responsible for its own set of memory packages.

In one embodiment, non-volatile memory 104 comprises a plurality of memory packages. Each memory package includes one or more memory die. Therefore, Controller 102 is connected to one or more non-volatile memory die. In one embodiment, each memory die in the memory packages 104 utilize NAND flash memory (including two-dimensional NAND flash memory and/or three-dimensional NAND flash memory). In other embodiments, the memory package can include other types of memory.

Controller 102 communicates with host 120 via an interface 130 that implements NVM Express (NVMe) over PCI Express (PCIe). For working with memory system 100, host 120 includes a host processor 122, host memory 124, and a PCIe interface 126. Host memory 124 is the host's physical memory, and can be DRAM, SRAM, non-volatile memory or another type of storage. Host 120 is external to and separate from memory system 100 (e.g., an SSD). In one embodiment, memory system 100 is embedded in host 120.

Figure 2:
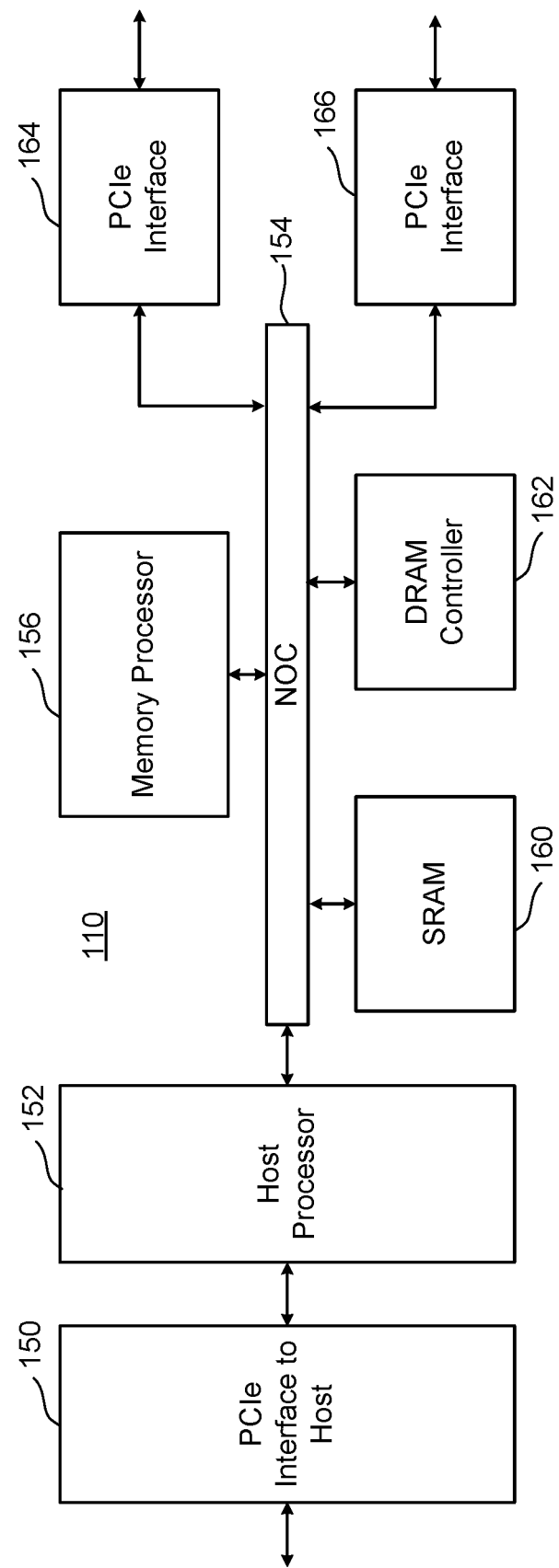
FIG. 2 is a block diagram of one embodiment of a Front End Processor Circuit. The Front End Processor Circuit is part of a Controller.

FIG. 2 is a block diagram of one embodiment of FEP circuit 110. FIG. 2 shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 2, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

Figure 3:
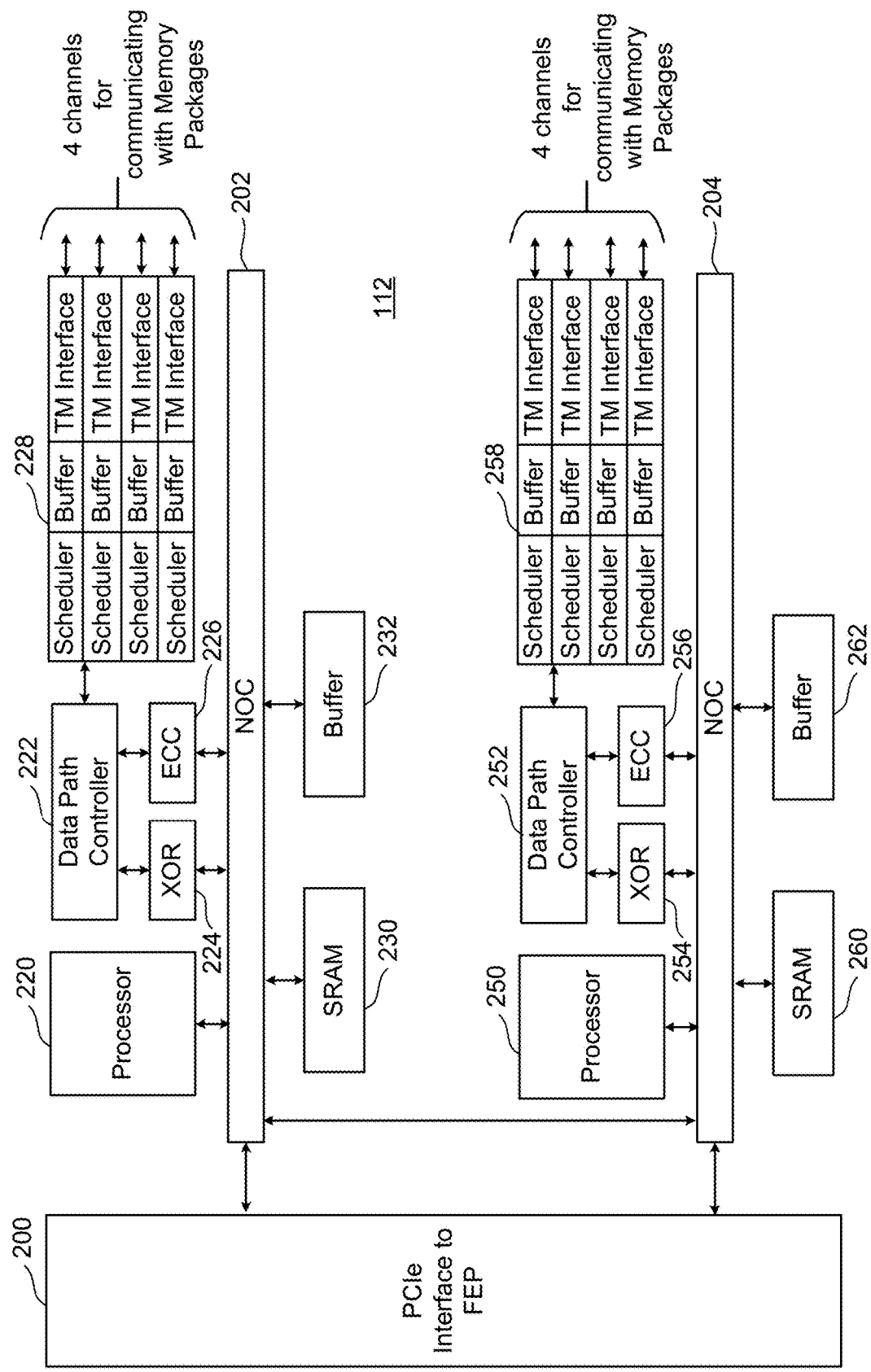
FIG. 3 is a block diagram of one embodiment of a Back End Processor Circuit. In some embodiments, the Back End Processor Circuit is part of a Controller.

FIG. 3 is a block diagram of one embodiment of the BEP circuit 112. FIG. 3 shows a PCIe Interface 200 for communicating with the FEP circuit 110 (e.g., communicating with one of PCIe Interfaces 164 and 166 of FIG. 2). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. Data path controller 22 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

Figure 4:
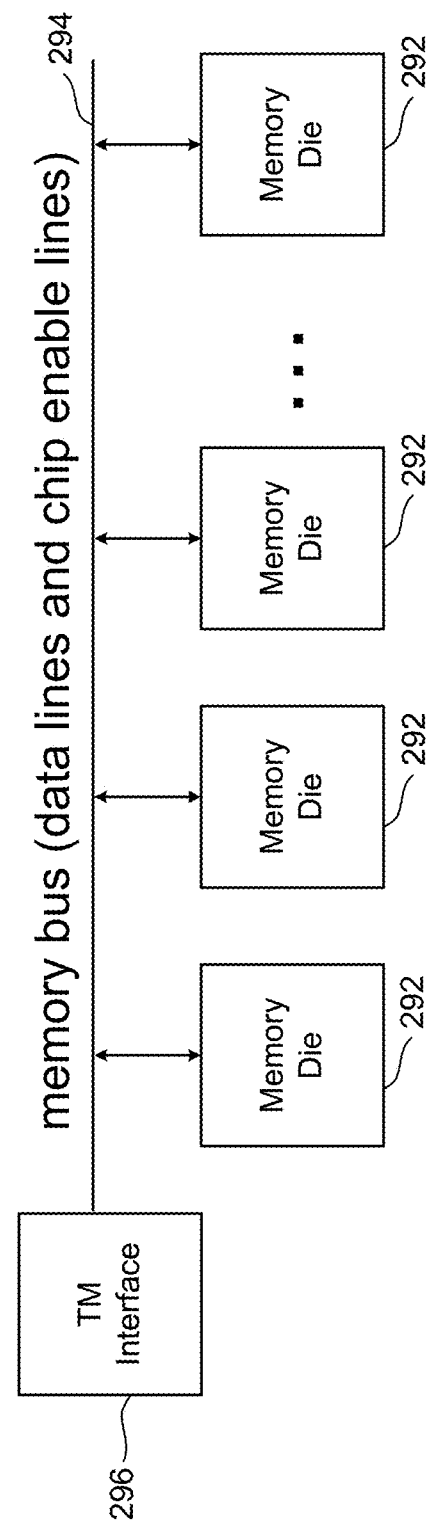
FIG. 4 is a block diagram of one embodiment of a memory package.

FIG. 4 is a block diagram of one embodiment of a memory package of non-volatile memory 104 that includes a plurality of memory die 292 connected to a memory bus 294 (data lines and chip enable lines). The memory bus 294 connects to a Toggle Mode Interface 296 for communicating with the TM Interface of a BEP circuit 112 (see e.g. FIG. 3). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 5:
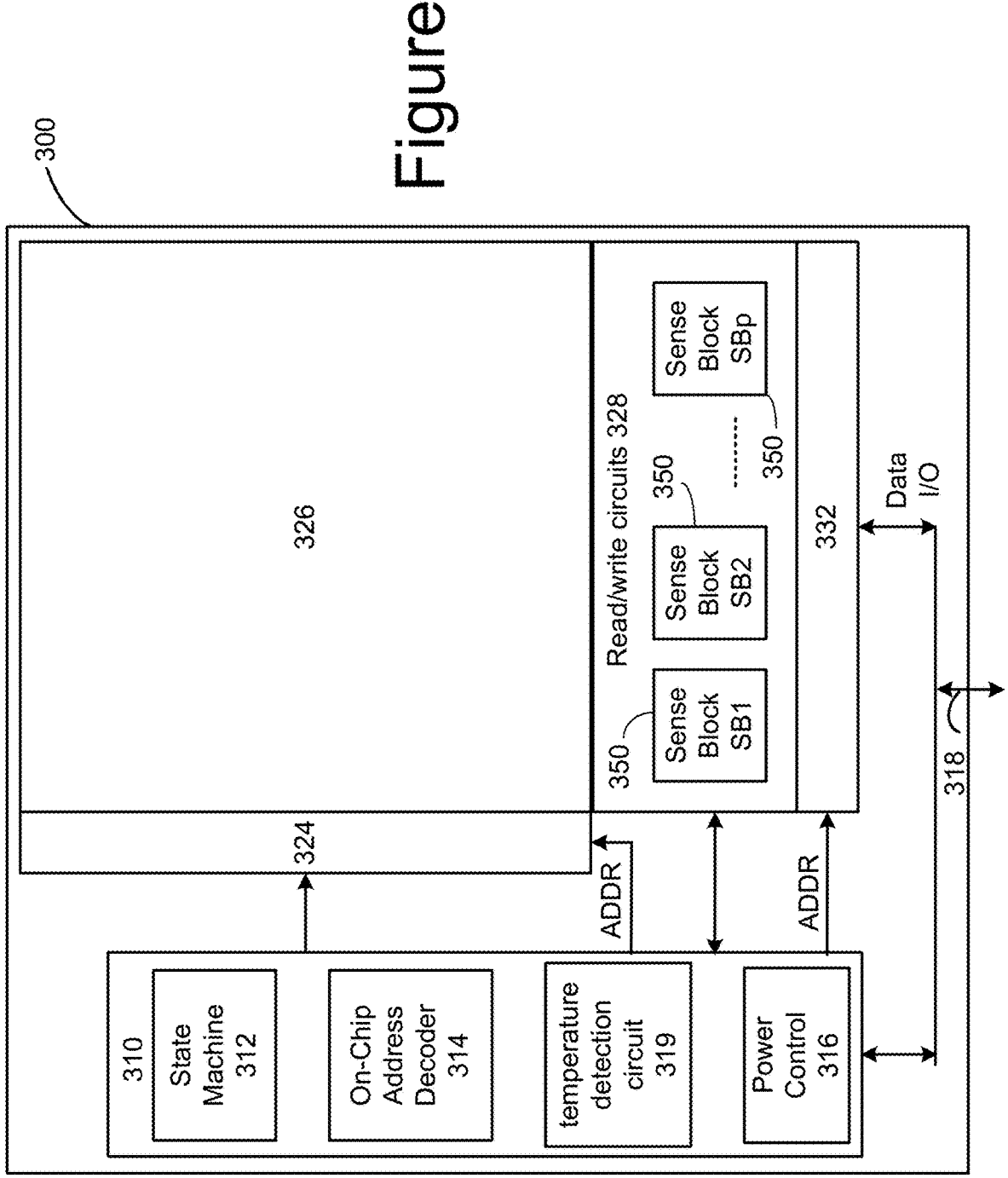
FIG. 5 is a block diagram of one embodiment of a memory die.

FIG. 5 is a functional block diagram of one embodiment of a memory die 300. The components depicted in FIG. 5 are electrical circuits. In one embodiment, each memory die 300 includes a memory structure 326, control circuitry 310, and read/write circuits 328. Memory structure 326 is addressable by word lines via a row decoder 324 and by bit lines via a column decoder 332. The read/write circuits 328 include multiple sense blocks 350 including SB1, SB2, . . . , SBp (sensing circuitry) and allow a page of memory cells to be read or programmed in parallel. Commands and data are transferred between the Controller and the memory die 300 via lines 318. In one embodiment, memory die 108 includes a set of input and/or output (I/O) pins that connect to lines 118.

Control circuitry 310 cooperates with the read/write circuits 328 to perform memory operations (e.g., write, read, and others) on memory structure 326, and includes a state machine 312, an on-chip address decoder 314, a power control module 316 (power control circuit) and a temperature detection circuit 319. State machine 312 provides die-level control of memory operations. In one embodiment, state machine 312 is programmable by software. In other embodiments, state machine 312 does not use software and is completely implemented in hardware (e.g., electrical circuits). In one embodiment, control circuitry 310 includes buffers such as registers, ROM fuses and other storage devices for storing default values such as base voltages and other parameters.

The on-chip address decoder 314 provides an address interface between addresses used by Controller 102 to the hardware address used by the decoders 324 and 332. Power control module 316 controls the power and voltages supplied to the word lines and bit lines during memory operations. Power control module 316 may include charge pumps for creating voltages. The sense blocks include bit line drivers.

In one embodiment, memory structure 326 comprises a three dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping material such as described, for example, in U.S. Pat. No. 9,721,662, incorporated herein by reference in its entirety.

In another embodiment, memory structure 326 comprises a two dimensional memory array of non-volatile memory cells. In one example, the non-volatile memory cells are NAND flash memory cells utilizing floating gates such as described, for example, in U.S. Pat. No. 9,082,502, incorporated herein by reference in its entirety. Other types of memory cells (e.g., NOR-type flash memory) can also be used.

The exact type of memory array architecture or memory cell included in memory structure 326 is not limited to the examples above. Many different types of memory array architectures or memory technologies can be used to form memory structure 326. No particular non-volatile memory technology is required for purposes of the new claimed embodiments proposed herein. Other examples of suitable technologies for memory cells of the memory structure 326 include ReRAM memories, magnetoresistive memory (e.g., MRAM, Spin Transfer Torque MRAM, Spin Orbit Torque MRAM), phase change memory (e.g., PCM), and the like. Examples of suitable technologies for memory cell architectures of the memory structure 126 include two dimensional arrays, three dimensional arrays, cross-point arrays, stacked two dimensional arrays, vertical bit line arrays, and the like.

One example of a ReRAM, or PCMRAM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse but includes a (continuous or non-continuous) vibration or burst of sound, current, voltage light, or other wave.

In some cases, die variables associated with non-volatile memory dies may be useful to a memory controller to determine how the non-volatile memory die should operate. Non-volatile memory die temperature is an example of a die variable that may be useful to a memory controller. Characteristics of a non-volatile memory die may change according to temperature and, in some cases, a controller coupled to such non-volatile memory dies may adjust for changes in temperature if it has non-volatile memory die temperature information. For example, memory cells that are written at a first temperature and read at a second temperature may be read using different read threshold voltages than if they were read at the first temperature. In some cases, heating of a non-volatile memory die may be reduced by slowing or stopping access to the non-volatile memory die for a period of time. Slowing of a non-volatile memory die may be achieved by changing a clock signal or other technique. Where a controller is coupled to two or more non-volatile memory dies, the controller may request die temperature and/or other die variable information from the non-volatile memory dies using commands. The non-volatile memory dies may respond to such commands by sending requested die variable information.

Figure 6:
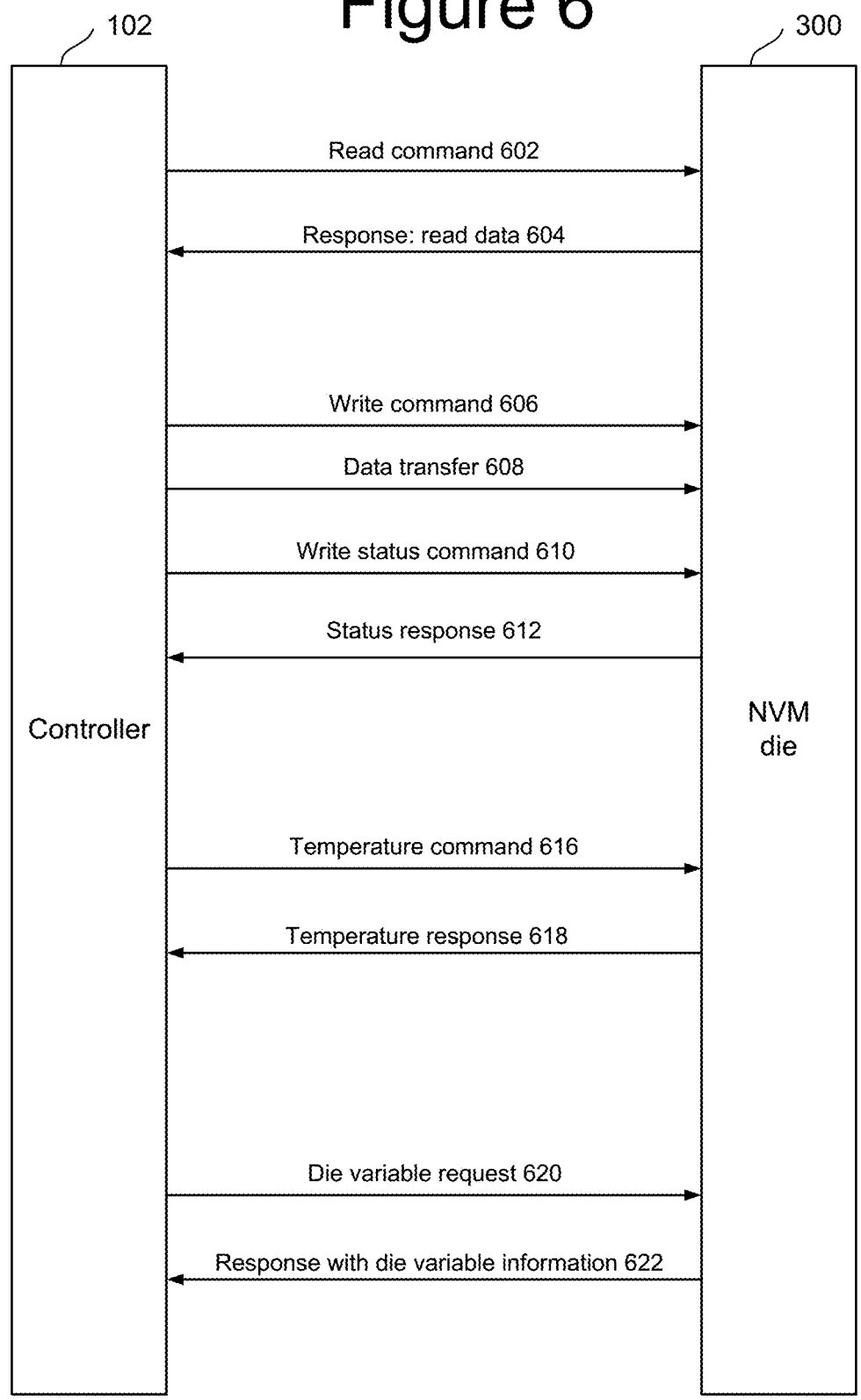
FIG. 6 illustrates an example of communication between a controller and a non-volatile memory die.

FIG. 6 illustrates some examples of communication between controller 102 and non-volatile memory die 300. For example, communication shown in FIG. 6 may occur along lines 318 between memory die 300 and BEP 112 of controller 102. Lines 318 may form a memory bus that allows for transfer of data and commands between memory die 300 and controller 102. In an example of controller-memory communication, controller 102 sends a die access command, read command 602, to non-volatile memory die 300. The read command may specify one or more address of data to be read from non-volatile memory cells in non-volatile memory die 300. In response to receiving read command 602 from controller 102, non-volatile memory die 300 reads the data identified in read command 602 from the non-volatile memory cells and responds to read command 602 by sending a response, in this case, read data transfer 604.

In another example, controller 102 sends another die access command, write command 606, to non-volatile memory die 300. Controller 102 then transfers data to be written in non-volatile memory cells of non-volatile memory die 300 in data transfer 608. Subsequently, controller 102 sends a write status command 610. Write status command 610 is a request for the status of write command 606, i.e. a request asking non-volatile memory die 300 whether writing of the data transferred by data transfer 608 has completed. In response to write status command 610, non-volatile memory die 300 checks whether writing is complete and sends status response 612 to reflect the current status (i.e. to tell controller 102 whether writing is complete).

In another example, controller 102 sends a temperature request 616 to non-volatile memory die 300. Temperature request 616 may be a dedicated command directing non-volatile memory die 300 to send back temperature information. Some non-volatile memory dies include temperature detection circuits such as temperature detection circuit 319 that allow them to measure temperature at one or more locations on a die. Non-volatile memory die 300 obtains temperature information from such circuits and sends temperature response 618 to controller 102, thus informing controller 102 of non-volatile memory die temperature, which controller 102 may use to manage operation of non-volatile memory die 300.

While temperature is one example of a die variable that may be sent by a non-volatile memory die, other die variables may also be sent, and the present technology may be applied to any die variable. In the example shown in FIG. 6, controller 102 sends die variable request 620 to non-volatile memory die 300. In response, non-volatile memory die obtains information regarding the die variable requested and sends a response with die variable information 622 to controller 102.

In general, communication between a controller and non-volatile memory die(s) occurs one command at a time, with some gap between individual commands. On a memory bus, there may be some delay between communications from different entities using the bus (e.g. between a controller sending a command and a non-volatile memory die sending a response to the command). Control of the bus may change between entities in such exchanges, which may take some time.

Figure 7:
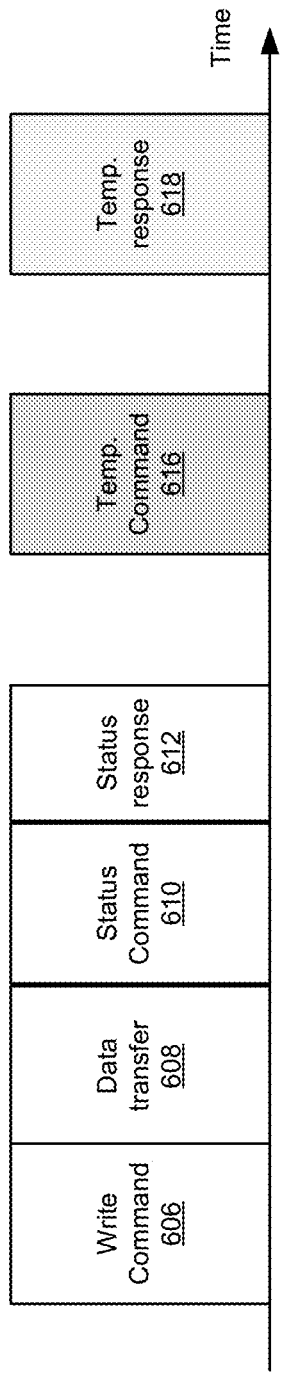
FIG. 7 illustrates an example of write and temperature commands from a controller to a non-volatile memory die and responses from the non-volatile memory die.

FIG. 7 shows an example of timing of a programming operation as previously illustrated in FIG. 6 including a write command 606, data transfer 608, status command 610, and status response 612, and subsequent die temperature operation including temperature command 616 and temperature response 618, in a memory system. FIG. 7 shows the order of these operations and the existence of certain gaps (other gaps may also occur, for example, between status command 610 and status response 612). FIG. 7 is not intended to be to scale (e.g. data transfer may take significantly longer than a status command).

Figure 8:
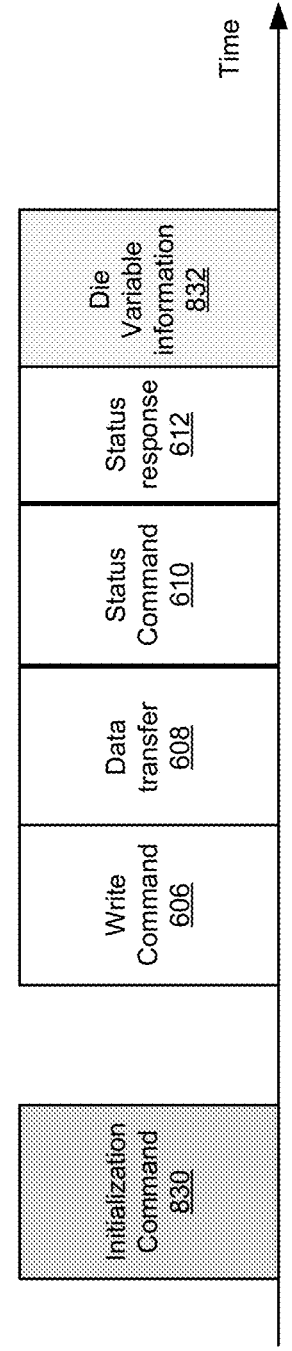
FIG. 8 illustrates an example of a write command from a controller to a non-volatile memory die and a response together with sending die variable information.

An alternative to the scheme illustrated in FIG. 7 is shown in FIG. 8. In the scheme of FIG. 8, an initialization command 830 is sent from controller 102 to non-volatile memory die 300. No immediate response is sent by non-volatile memory die 300. Initialization command 830 commands non-volatile memory 300 to initialize a scheme of sending die variable information with responses to subsequent commands. Subsequently, the programming operation including write command 606, data transfer 608, status command 610, and status response 612 is performed. However, in this example, non-volatile memory die 300 sends die variable information 832 together with status response 612 to controller 102. In response to initialization command 830, non-volatile memory die 300 implements a scheme of piggybacking die variable information on responses to one or more subsequent commands, in this case, piggybacking die variable information 832 on status response 612, which is in response to status command 610. Die variable information 832 may be appended to status response 612 or otherwise sent together with status response 612. In general, sending die variable information in this way saves time compared with the scheme illustrated in FIG. 7. Die variable information 832 may be temperature information or other die variable information that controller 102 may request.

Figure 9:
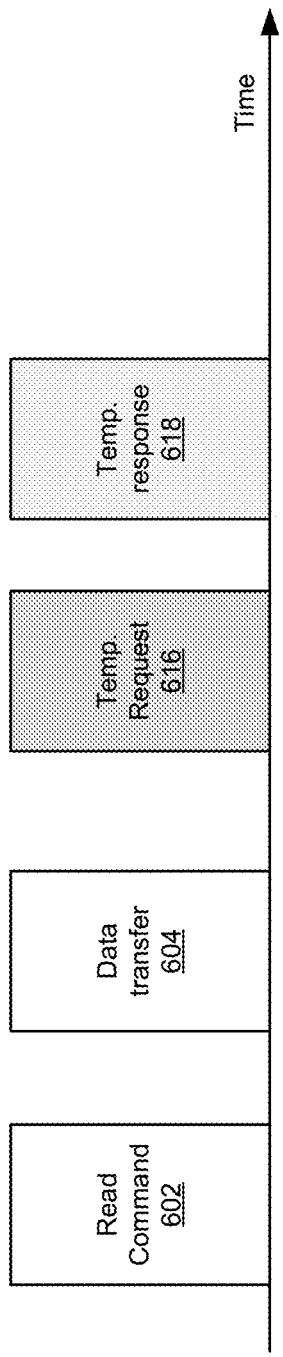
FIG. 9 illustrates an example of read and temperature commands from a controller to a non-volatile memory die and responses from the non-volatile memory die.

FIG. 9 shows an example of timing of a read operation as previously illustrated in FIG. 6 including read command 602, read data transfer 604, and subsequent die temperature operation including temperature command 616 and temperature response 618, in a memory system. FIG. 9 shows the order of these operations and the existence of certain gaps but is not intended to be to scale (e.g. data transfer may take significantly longer than other steps).

Figure 10:
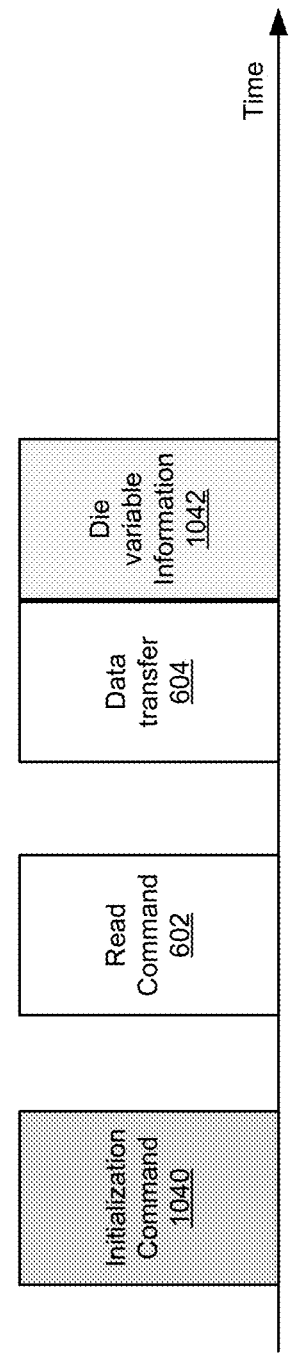
FIG. 10 illustrates an example of a read command from a controller to a non-volatile memory die and a response together with sending die variable information.

An alternative to the scheme illustrated in FIG. 9 is shown in FIG. 10. In the scheme of FIG. 10, an initialization command 1040 is sent from controller 102 to non-volatile memory die 300. No immediate response is sent by non-volatile memory die 300. Initialization command 1040 commands non-volatile memory 300 to initialize a scheme of sending die variable information with subsequent responses to subsequent commands. Subsequently, the read operation including read command 602 and data transfer 604 is performed. However, in this example, non-volatile memory die 300 sends die variable information 1042 together with data transfer 604 to controller 102. In response to initialization command 1040, non-volatile memory die 300 implements a scheme of piggybacking die variable information on subsequent responses to one or more subsequent commands, in this case, piggybacking die variable information 1042 on data transfer 604, which is in response to read command 602. Die variable information 1042 may be appended to data transfer 604, prepended to data transfer 604, inserted into data transfer 604, interleaved with data transfer 604, or otherwise sent together with data transfer 604. In general, sending die variable information in this way saves time compared with the scheme illustrated in FIG. 9. Die variable information 1042 may be temperature information or other die variable information that controller 102 may request.

While die variable information 832 is sent together with write status response 612 in response to status command 610 in FIG. 8, die variable information 1042 is sent with data transfer 604 in response to read command 602 in FIG. 10. Thus, initialization command 830 and initialization command 1040 are directed to different schemes that attach die variable information to different responses that are sent in response to different die access commands (write and read commands respectively). The die variable information to be attached may also be different. In some cases, more than one such scheme may be in operation at a given time, e.g. different die variable information may be sent with different responses.

While the examples of FIGS. 8 and 10 illustrate some time saving in examples that include a non-volatile memory die sending die variable information once, additional time saving may be gained where an initialization command configures a non-volatile memory die to send die variable information multiple times. For example, where a die variable is to be monitored over some period of operation, it may be desirable to have a non-volatile memory die send die variable information two or more times during the period of operation to provide updates (e.g. to monitor non-volatile die temperature in real time or near real time).

Figure 11:
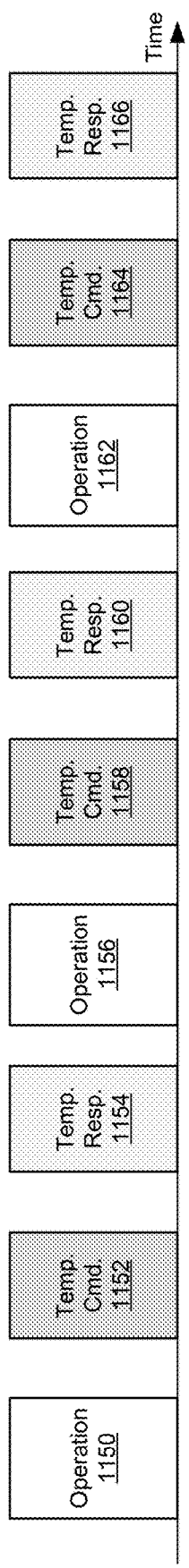
FIG. 11 illustrates an example of multiple temperature commands between memory access operations.

FIG. 11 illustrates an example of communication between a controller and non-volatile memory die (e.g. between controller 102 and non-volatile memory die 300) that uses dedicated temperature commands and responses. This corresponds to the examples of FIGS. 7 and 9, which illustrate examples of a write operation and a read operation respectively. FIG. 11 shows an extended period of operation during which multiple operations are performed (e.g. read, write, or other operations) and during which the non-volatile memory die sends responses to multiple temperature commands. Specifically, after operation 1150, controller 102 sends temperature command 1152 and in response, non-volatile memory die 300 sends temperature response 1154. Subsequently, after operation 1156, controller 102 sends temperature command 1158 and in response, non-volatile memory die 300 sends temperature response 1160. Subsequently, after operation 1162, controller 102 sends temperature command 1164 and in response, non-volatile memory die 300 sends temperature response 1166. It will be understood that operations 1150, 1156, and 1162 may be read, write, or other operations that include one or more command and response (e.g. a write operation may include a write command, data transfer, write status command, and write status response, and a read operation may include a read command and data transfer).

Figure 12:
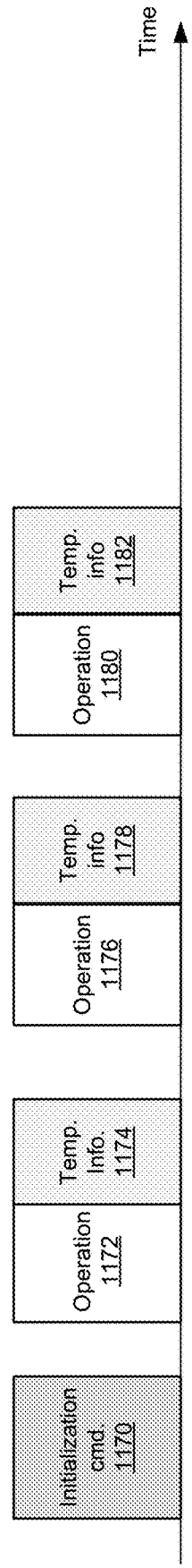
FIG. 12 illustrates an example of operations in which temperature information is sent with responses to memory access commands.

In contrast with the scheme of FIG. 11, FIG. 12 shows an example of communication between a controller and non-volatile memory die (e.g. between controller 102 and non-volatile memory die 300) that uses piggybacking of temperature information with responses to die access commands that are sent during die access operations. FIG. 12 shows initialization command 1170 that is sent from controller 102 to initialize piggybacking by non-volatile memory die 300. Subsequently, operation 1172 is performed (which may include various interactions between controller 102 and non-volatile memory die 300) and temperature information 1174 is sent with a response from non-volatile memory die 300. Subsequently, operation 1176 is performed and temperature information 1178 is sent with a response from non-volatile memory die 300. Subsequently, operation 1180 is performed and temperature information 1182 is sent with a response from non-volatile memory die 300. In contrast with the scheme of FIG. 11, no dedicated temperature commands are sent to non-volatile memory die 300 to cause sending of temperature information. A single initialization command (initialization command 1170) initiates sending of temperature information with responses of subsequent operations without requiring any further command from controller 102, thus reducing utilization of a memory bus. Furthermore, because temperature information is sent together with responses of die access operations such as operations 1172, 1176, and 1180, the bus is efficiently used.

Figure 13:
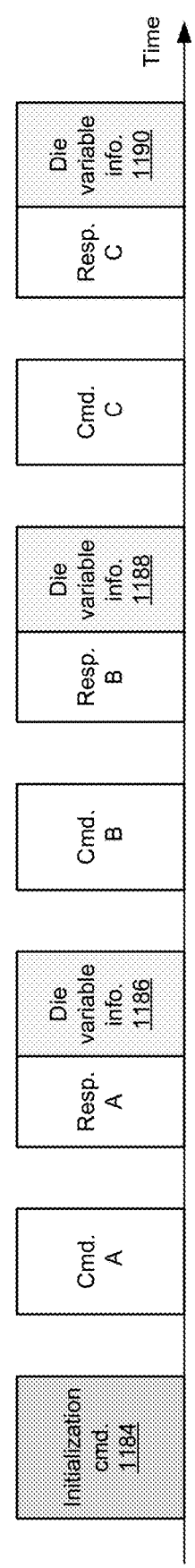
FIG. 13 illustrates examples of sending die variable information with responses to memory access commands.

FIG. 13 illustrates an example of communication between a controller and non-volatile memory die (e.g. between controller 102 and non-volatile memory die 300) that shows individual commands and responses of operations (e.g. commands and responses of operations 1172, 1176, and 1180 of FIG. 12). FIG. 13 shows piggybacking of die variable information with responses to die access commands. FIG. 12 shows initialization command 1184 that is sent from controller 102 to initialize piggybacking by non-volatile memory die 300. Subsequently, controller 102 sends command A (e.g. write status command, read command, or other command). In response to command A, non-volatile memory die 300 sends response A (e.g. write status response, data read from non-volatile memory cells of non-volatile memory die 300, or other response). Controller 102 also sends die variable information 1186 together with response A (e.g. appended or otherwise combined with response A). Subsequently, controller 102 sends command B (e.g. write status command, read command, or other command). In response to command B, non-volatile memory die 300 sends response B. Controller 102 also sends die variable information 1188 together with response B. Subsequently, controller 102 sends command C. In response to command C, non-volatile memory die 300 sends response C. Controller 102 also sends die variable information 1190 together with response C. Thus, non-volatile memory die 300 receives initialization command 1184 (first command), which is a command to send die variable information with a response to command A (and commands B and C in this example). The die variable information may be related to operation of the non-volatile memory die (e.g. temperature or other die variable that relates to memory operation).

While the examples of FIGS. 11-13 show temperature being sent by a non-volatile memory die after every operation, this may not always be the case. For example, additional operations may be performed between sending temperature information in FIG. 12 and additional commands and responses may be send between sending die variable information in FIG. 13. In some cases, a controller may specify die variable sending requirements, such as sending frequency, timing, number of times to send, and/or other requirements in an initialization command such as initialization commands 1170, 1184. In addition, in schemes that are configured for sending information for multiple die variables, an initialization command may specify die variable information that is to be sent by using die variable identifiers. For example, a controller may specify that non-volatile memory die temperature is to be sent using a die variable identifier that is unique to non-volatile memory die temperature. Each die variable that is enabled may be associated with a unique identifier that allows a controller to specify the die variable to the non-volatile memory die.

Figure 14:
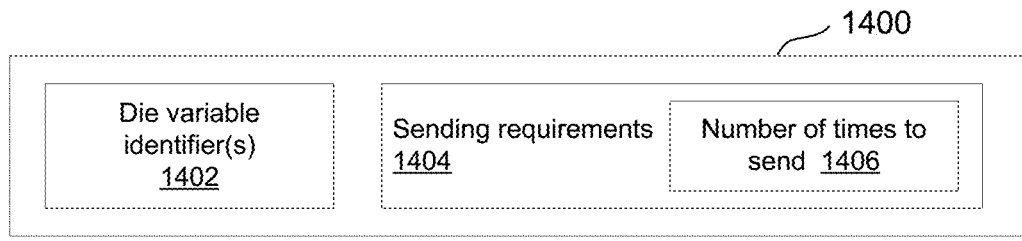
FIG. 14 illustrates an example of an initialization command.

FIG. 14 illustrates an example of an initialization command 1400, such as initialization commands 1170, 1184, that may be used to initiate piggybacking of die variable information by a non-volatile memory die (e.g. sent by controller 102 to initiate piggybacking of die variable information by non-volatile memory die 300). Initialization command 1400 includes die variable identifier(s) 1402 which may include one or more die variable identifiers that uniquely identify corresponding die variable information that is to be sent by non-volatile memory die 300 to controller 102 (e.g. temperature). Initialization command 1400 also includes sending requirements 1404, which may include information about how and when non-volatile memory die 300 is to send the requested die variable information. For example, sending requirements 1404 includes a number of times to send 1406, which provides non-volatile memory die 300 with a predetermined finite or infinite number of times to send the requested die variable information. In some cases, a flag may indicate that requested die variable information is to be sent without limit (i.e. the number of times to send may be infinite). In this case, requested die variable information may be sent until a subsequent initiation command overwrites the sending requirements to stop the infinite request. Sending requirements 1404 may also include additional requirements such as frequency of sending (e.g. every other response, every ten responses, etc.) type of responses to use for piggybacking (e.g. write status responses, transfers of read data, and/or other responses). A subsequent command may overwrite a sending requirements of a previous initialization command so that where non-volatile memory die 300 is sending requested die variable information up to some number of times (where the number may be finite or infinite), the number may be overwritten prior to achieving the number.

Figure 15:
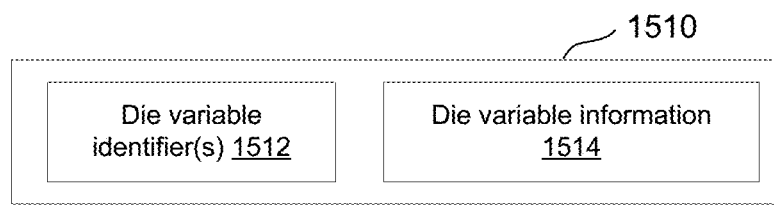
FIG. 15 illustrates an example of a die variable information packet.

In schemes that are configured to piggyback more than one type of die variable information, one or more die variable identifier may be sent with die variable information to indicate to a controller which type of die variable information is being sent. FIG. 15 shows an example of a die variable information packet 1510 that includes die variable identifier(s) 1512 and die variable information 1514. For example, die variable information 1514 may include one or more types of die variable information (e.g. temperature) that is identified by a corresponding die variable identifier in die variable identifier(s) 1512. While more than one type of die variable information may be sent together in a single die variable information packet that is sent with a single reply in some cases, in other cases, different types of die variable information are separately sent with different replies.

Figure 16:
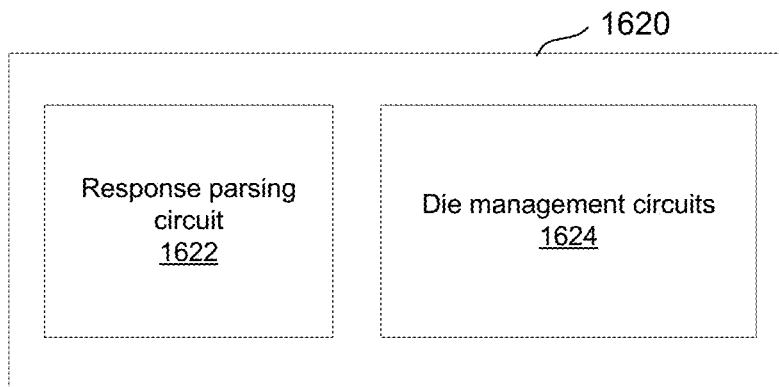
FIG. 16 illustrates an example of control circuits in a controller.

When a controller, such as controller 102 receives a command response with a die variable information packet, such as die variable information packet 1510, it may parse it to determine what die variable information has been received and may then use the die variable information to manage a non-volatile memory die appropriately. FIG. 16 shows an example of control circuits 1620 that may be provided in a controller such as controller 102. For example, control circuits 1620 may be formed as dedicated circuits in BEP 112 or may be implemented through software configuration of configurable circuits (e.g. of processor 220) or some combination. Control circuits 1620 include response parsing circuit 1622, which parses responses received from a non-volatile memory die to determine if the non-volatile memory die has sent any die variable information together with the responses. For example, where die variable information is appended to a response, the response parsing circuit 1622 may focus on data received immediately after the end of a response (e.g. after all requested read data is received in response to a read command) to identify die variable information. Where die variable data is sent together with a response in some other manner (inserted or interleaved) response parsing circuit 1622 may extract the die variable data from the response in an appropriate manner. Response parsing circuit may further extract one or more die variable identifiers from die variable packets (e.g. extract die variable identifier(s) 1512 from die variable information packet 1510) to determine what type of die variable information has been received from a non-volatile memory die (e.g. what type of die variable information is included in die variable information 1514). Different types of die variable information may be sent to appropriate circuits accordingly. Control circuits 1620 include die management circuits 1624, which manage aspects of operation of one or more non-volatile memory dies. Response parsing circuit 1622 may send die variable information to die management circuits 1624, which may use die variable information to determine how to manage the non-volatile memory dies.

Figure 17:
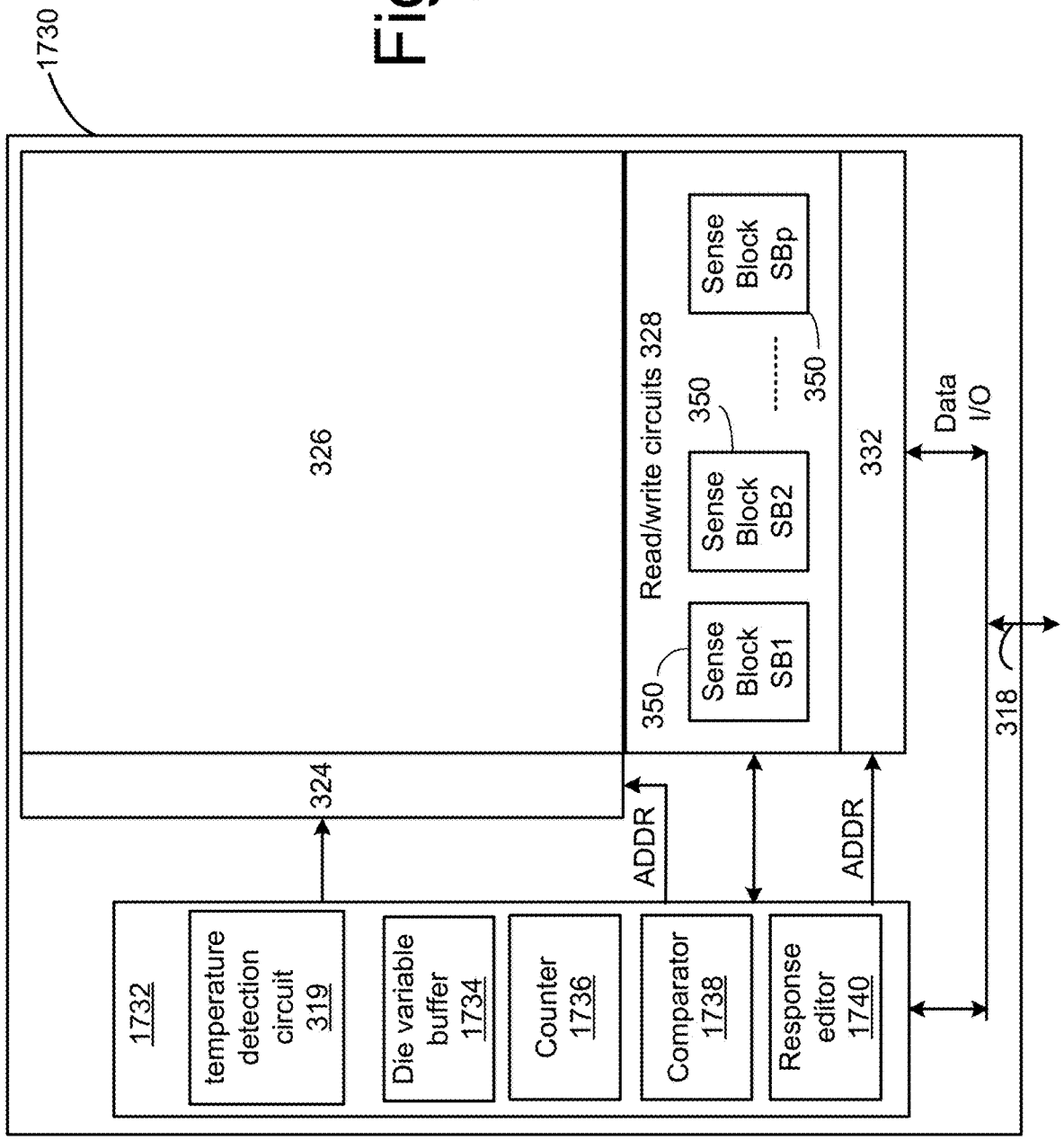
FIG. 17 illustrates an example of a non-volatile memory die.

A non-volatile memory die may include certain components that facilitate piggybacking schemes such as described above. For example, control circuitry in anon-volatile memory die (such as control circuitry 310 of non-volatile memory die 300) may be modified to include components to facilitate piggybacking (e.g. to facilitate schemes of FIGS. 12 and 13). FIG. 17 illustrates an example of a non-volatile memory die 1730 that includes die control circuitry 1732 and other components that are similar to those of non-volatile memory die 300 and are similarly numbered (e.g. memory structure 326, row decoder 324, column decoder 332, read/write circuits 328 including multiple sense blocks 350, and lines 318). Thus, non-volatile memory die 1730 may be considered as an example of how non-volatile memory die 300 may be configured to facilitate piggybacking.

Die control circuitry 1732 includes temperature detection circuit 319, which is configured to detect the temperature of non-volatile memory die 1730. Die variable buffer 1734 is a buffer that is connected to temperature detection circuit 319 and is configured to hold temperature information from temperature detection circuit 319 and hold any other die variable information from other circuits. Die variable buffer may be considered a means for storing die variable information (e.g. a means for storing die temperature information). In some cases, different buffers may be used as die variable buffers at different times (e.g. a buffer that contains a die variable of interest may be designated as a die variable buffer by an initialization command using a die variable identifier, while at other times the buffer may be used for other purposes). Counter 1736 is configured to count a number of times that die variable information has been sent to controller 102 after an initialization command. Counter 1736 may be set to zero when an initialization command is received and may subsequently be incremented each time die variable information is sent from die variable buffer 1734 over lines 318. Comparator 1738 compares a number from counter 1736 with a predetermined number, e.g. a number received in an initialization command, such as number of times to send 1406 received in initialization command 1400. Thus, the number of times die variable information has been sent is compared with the number specified by an initialization command to check if the specified number has been reached (i.e. with predetermined number of times die variable information should be sent according to initialization command). Counter 1736 may be considered a means for counting a number of times die temperature information is added to responses to die access commands and comparator 1738 may be considered a means for comparing a counted number of times with a predetermined number. Counter 1736 may be disabled when an initialization command indicates that die variable information is to be sent an infinite number of times (i.e. the number of times to send=infinity as indicated by a flag or other indicator). Counter 1736 may be reset by a command subsequent to the initialization command (e.g. subsequent initialization command initializing a different scheme, or a dedicated command to terminate an on-going scheme). Response editor 1740 is configured to edit responses to die access commands to send die variable information together with responses. For example, response editor 1740 may append, prepend, insert, interleave, or otherwise combine die variable information from die variable buffer 1734 with responses to commands (e.g. with write status responses in response to write status commands, read data in response to read commands, or other responses). Response editor 1740 may combine die variable data with die variable identifiers in a die variable packet (e.g. forming die variable information packet 1510 including die variable identifier(s) 1512 and die variable information 1514) and may combine the resulting die variable packet with a response. Response editor 1740 may be considered a means for adding die variable information, e.g. non-volatile memory die temperature information, to one or more responses to die access commands (where the die access commands do not include a die temperature request, e.g. read commands, write commands, etc.). Receipt of an initialization command (e.g. initialization command 1400) may cause die control circuitry 1732 to initiate piggybacking, which includes response editor 1740 editing responses to subsequently received commands to include die variable information. This may continue according to sending requirements (e.g. according to sending requirements 1404, including sending die variable information until a number indicated by counter 1736 equals the number of times to send 1406 of initialization command 1400 as indicated by comparator 1738). It will be understood that die control circuitry 1732 may include additional components that are not shown in FIG. 17 (including components shown in non-volatile memory die 300 of FIG. 5) and that the components shown are selected to illustrate certain aspects described above.

Figure 18:
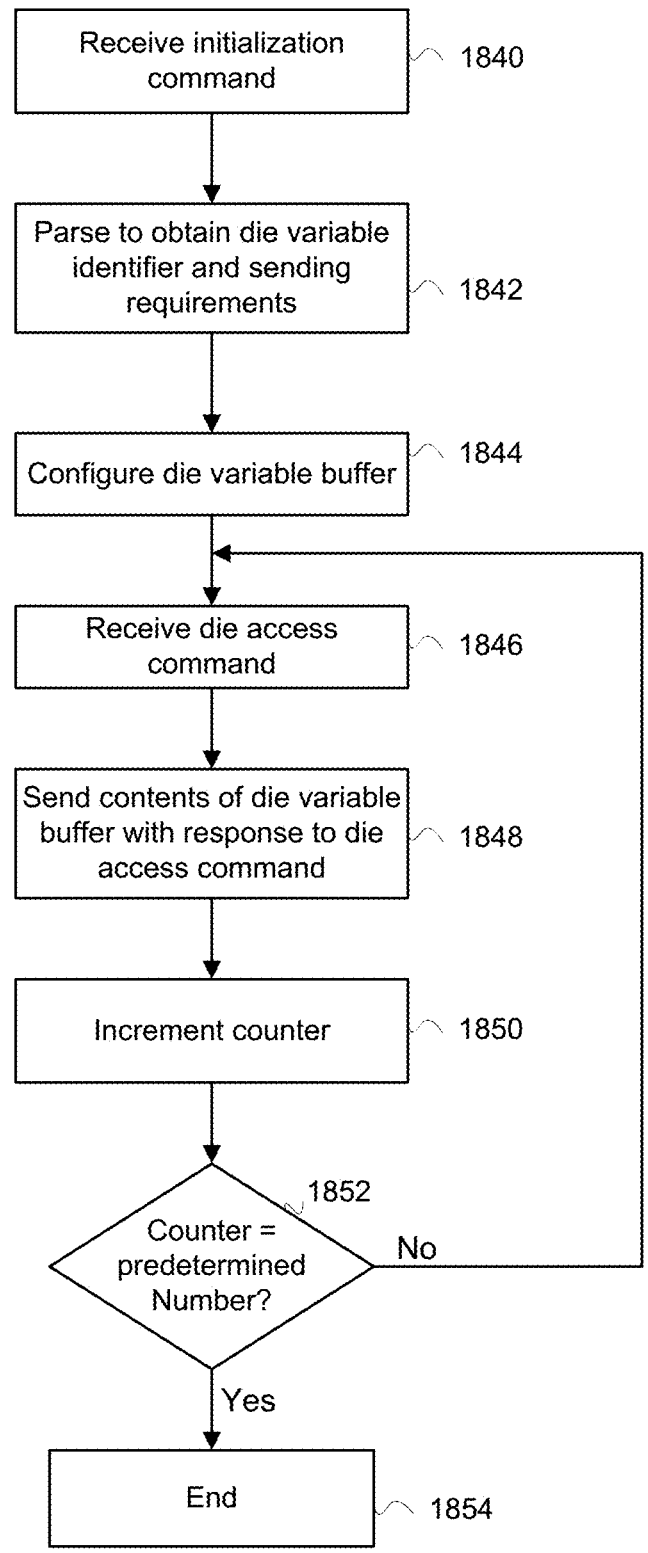
FIG. 18 illustrates an example of a method that includes adding contents of a die variable buffer to a response to a die access command.

FIG. 18 illustrates an example of some aspects of operation of die control circuitry 1732 of non-volatile memory die 1730. Non-volatile memory die 1730 receives an initialization command 1840 from controller 102. Non-volatile memory die 1730 parses the initialization command to obtain one or more die variable identifier and sending requirements 1842. Non-volatile memory die 1730 then configures die variable buffer 1844 to accept and store corresponding die variables. Subsequently, non-volatile memory die 1730 receives a die access command 1846 (e.g. read or write command) and sends contents of die variable buffer 1734 with a response to the die access command 1848. Counter 1736 is incremented 1850 and a determination is made 1852 as to whether the number indicated by counter 1736 is equal to a predetermined number (e.g. comparator 1738 compares the number from counter 1736 with the number of times to send 1406). If these values are equal, then piggybacking ends 1854. If these values are not equal then non-volatile memory die 1730 waits for a subsequent die access command and proceeds through steps 1846, 1848, 1850, and 1852 with one or more subsequent die access commands.

Figure 19:
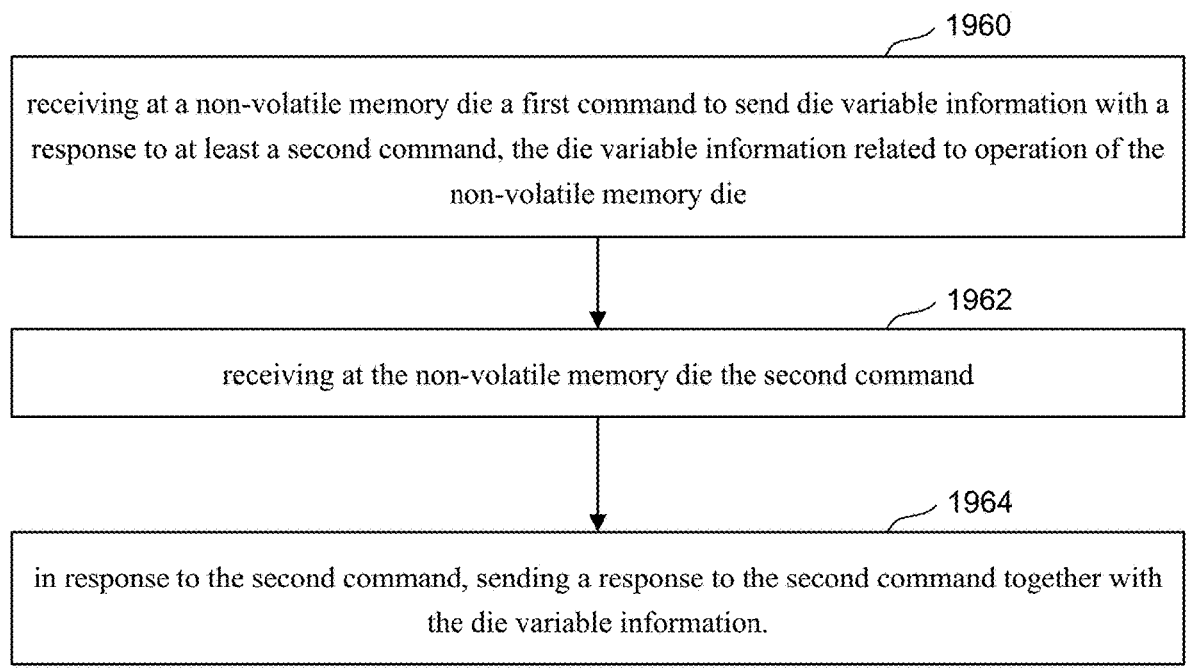
FIG. 19 illustrates an example of a method that includes sending die variable information together with a response to a command.

FIG. 19 illustrates an example of a method that may be implemented by hardware, for example, by non-volatile memory die 1730 (e.g. in communication with a controller, such as controller 102). The method includes receiving at a non-volatile memory die a first command to send die variable information with a response to at least a second command, the die variable information related to operation of the non-volatile memory die 1960. For example, the first command may be an initialization command that causes a non-volatile memory die to send die variable information (e.g. temperature information) with a response to another command, such as a read or write command. The method further includes receiving at the non-volatile memory die the second command 1962 and, in response to the second command, sending a response to the second command together with the die variable information 1964 (e.g. sending a response to a read or write command together with temperature information). In some cases, the method may include, in response to the second command, sending a die variable identifier to identify a type of information included in the die variable information (e.g. to identify temperature information).

Figure 20:
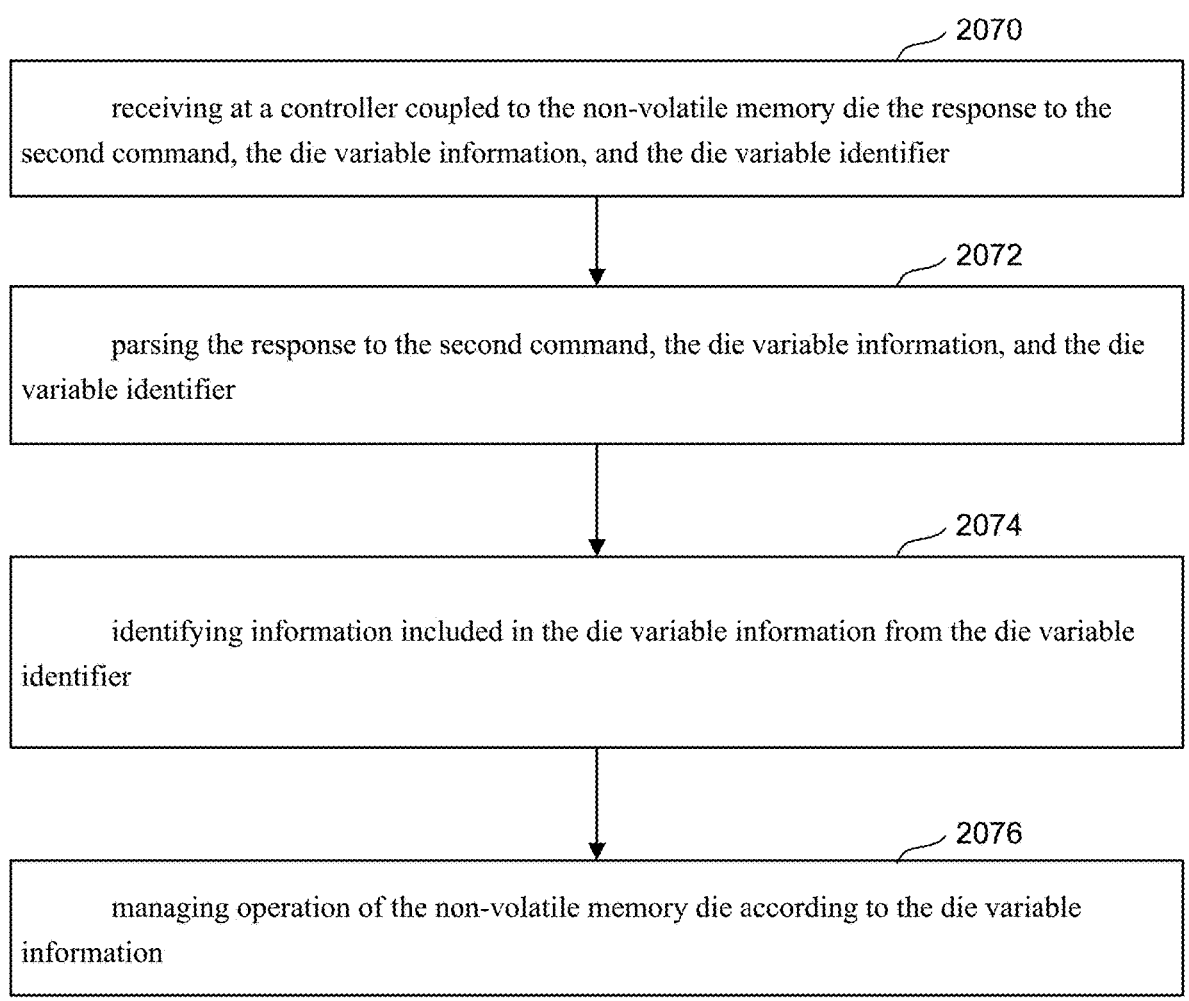
FIG. 20 illustrates an example of a method that includes managing operation of a non-volatile memory die according to die variable information received at a controller.

FIG. 20 illustrates an example of a method that may be implemented, for example, by controller 102, e.g. in communication with non-volatile memory die 1730. The method of FIG. 20 corresponds to steps performed by a controller receiving the response to the second command together with die variable information illustrated in FIG. 19. The method includes receiving at a controller coupled to the non-volatile memory die the response to the second command, the die variable information, and die variable identifier 2070. The method includes parsing the response to the second command, the die variable information, and the die variable identifier 2072 and identifying information included in the die variable information from the die variable identifier 2074 (e.g. identifying temperature information from a die variable identifier that is unique to temperature information). The method further includes managing operation of the non-volatile memory die according to the die variable information 2076 (e.g. managing non-volatile memory die 1730 according to temperature information).

In general, components configured to implement techniques described in the examples above are compatible with components that are not configured to implement such techniques (e.g. backward-compatible). For example, a controller that is configured to initiate piggybacking and parse responses with piggybacked die variable information may send dedicated temperature commands when connected to a non-volatile memory die that is not configured to piggyback temperature information on responses. Non-volatile memory dies that are configured for piggybacking may also respond to dedicated temperature commands (e.g. from controllers that are not configured for parsing piggybacked information). Where a controller that is not configured to parse piggybacked information from responses receives a response that includes piggybacked information, the piggybacked information may appear as noise on a bus that is ignored (e.g. comes after a response and is therefore ignored). In some cases, a hand-shake routine may be used so that components discover configurations of connected components, e.g. determining by a hand-shake routine between the non-volatile memory die and a controller that the non-volatile memory die is configured to send die variable information together with command responses to the controller (to piggyback die variable information). Thus, a controller may initiate a hand-shake routine to discover whether a non-volatile memory die is configured to piggyback die variable information. The controller may then adapt its communication accordingly (e.g. initiating piggybacking for a die or dies that are configured for piggybacking and using dedicated temperature commands for a die or dies that are not configured for piggybacking).

A person of ordinary skill in the art will recognize that the technology described herein is not limited to a single specific memory structure, but covers many relevant memory structures within the spirit and scope of the technology as described herein and as understood by one of ordinary skill in the art.

An example of a non-volatile memory die includes a plurality of non-volatile memory cells and die control circuitry, the die control circuitry configured to respond to a received command to access the plurality of non-volatile memory cells by sending a response indicated by the received command together with die variable information, the die variable information including information not indicated by the received command.

The received command to access the plurality of non-volatile memory cells may be a read command, the response may be data read from the plurality of non-volatile memory cells, and the die variable information may include non-volatile memory die temperature information. The received command to access the plurality of non-volatile memory cells may be a write status command, the response may be a write status response indicating status of a write operation to the plurality of non-volatile memory cells, and the die variable information may include non-volatile memory die temperature information. Die control circuitry may be further configured to send a die variable identifier with the die variable information, the die variable identifier specifying a type of information included in the die variable information. The die control circuitry may be further configured to initiate sending the die variable information in response to an initiation command, the initiation command may include a die variable identifier to identify a type of die variable information to be sent with one or more subsequent responses to one or more received commands. The initiation command may include a number to indicate a predetermined finite or infinite number of times die variable information is to be sent with subsequent responses. The non-volatile memory die may include a counter configured to count a number of times die variable information is sent in response to the initiation command, the die control circuitry may be configured to cease sending the die variable information when the number reaches the predetermined number. The non-volatile memory die may include a buffer in the die control circuitry for storing the die variable information.

An example of a method includes receiving at a non-volatile memory die a first command to send die variable information with a response to at least a second command, the die variable information related to operation of the non-volatile memory die, receiving at the non-volatile memory die the second command, and in response to the second command, sending a response to the second command together with the die variable information.

The method may include determining by a hand-shake routine between the non-volatile memory die and a controller that the non-volatile memory die is configured to send the die variable information together with command responses to the controller. The method may include, in response to the second command, sending a die variable identifier to identify a type of information included in the die variable information. The method may include receiving at a controller coupled to the non-volatile memory die the response to the second command, the die variable information, and the die variable identifier; parsing the response to the second command, the die variable information, and the die variable identifier; identifying information included in the die variable information from the die variable identifier; and managing operation of the non-volatile memory die according to the die variable information. The method may include measuring a temperature of the non-volatile memory die and including the temperature of the non-volatile memory die in the die variable information. The second command may be a read command and sending the response to the second command together with the die variable information may include sending read data specified by the second command together with temperature of the non-volatile memory die or the second command may be a write status command and sending the response to the second command together with the die variable information may include sending a write status response together with the temperature of the non-volatile memory die.

An example of a memory system includes a non-volatile memory die configured to add die variable information to one or more responses to one or more die access commands, the die variable information not indicated by the one or more die access commands and a controller coupled to the non-volatile memory die, the controller configured to send the one or more die access commands to the non-volatile memory die and to parse the one or more responses from the die access commands to obtain the die variable information.

The controller may be further configured to send an initialization command to the non-volatile memory die to initialize adding die variable information by the non-volatile memory die. The controller may be further configured to include in the initialization command one or more die variable identifiers to identify one or more types of die variable information to be added by the non-volatile memory die. The controller may be further configured to include in the initialization command a number to indicate to the non-volatile memory die a finite or infinite number of times to add the die variable information to responses to die access commands and to send a command subsequent to the initialization command to terminate or modify adding the die variable information prior to reaching the number.

An example of a memory system includes a non-volatile memory die, the non-volatile memory die including: means for storing die temperature information, means for adding the die temperature information to one or more responses to die access commands, the die access commands not including a die temperature request, and a controller connected to the non-volatile memory die and configured to receive the responses to the die access commands and the die temperature information and to use the die temperature information to manage operation of the non-volatile memory die.

The non-volatile memory die may further include means for counting a number of times die temperature information is added to responses to die access commands and comparing a counted number of times with a predetermined number.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory die, comprising:
a plurality of non-volatile memory cells; and
die control circuits in the non-volatile memory die, the die control circuits configured to respond to a received read or write status command from a memory controller to access the plurality of non-volatile memory cells by generating a response indicated by the received read or write status command, editing the response to include die variable information including information related to operation of the non-volatile memory die that is not indicated by the received read or write status command, and sending the edited response to the memory controller.

2. The non-volatile memory die of claim 1 wherein the received command to access the plurality of non-volatile memory cells is a read command, the response is data read from the plurality of non-volatile memory cells, and the die variable information includes non-volatile memory die temperature information.

3. The non-volatile memory die of claim 1, wherein the command to access plurality of non-volatile memory cells is a write status command, the response is a write status response indicating status of a write operation to the plurality of non-volatile memory cells, and the die variable information includes non-volatile memory die temperature information.

4. The non-volatile memory die of claim 1 wherein the die control circuits are further configured to send a die variable identifier with the die variable information, the die variable identifier specifying a type of information included in the die variable information.

5. The non-volatile memory die of claim 1 wherein the die control circuits are further configured to initiate sending the die variable information in response to an initialization command, the initialization command including a die variable identifier to identify a type of die variable information to be sent with one or more subsequent responses to one or more received commands.

6. The non-volatile memory die of claim 5 wherein the initialization command includes a number to indicate a predetermined finite or infinite number of times die variable information is to be sent with subsequent responses.

7. The non-volatile memory die of claim 6 further comprising a counter configured to count a number of times die variable information is sent in response to the initialization command, the die control circuits configured to cease sending the die variable information when the number reaches the predetermined number.

8. The non-volatile memory die of claim 1 further comprising a buffer in the die control circuits for storing the die variable information.

9. A method, comprising:
receiving at a non-volatile memory die a first command to initialize a scheme of sending die temperature information with a response to at least a second command, the die temperature information including temperature at one or more locations on the non-volatile memory die;
in response to the first command, configuring a die temperature buffer in the non-volatile memory die to store the die temperature information;
receiving at the non-volatile memory die the second command, the second command is a read command directed to specified data stored in the non-volatile memory die or a write status command directed to writing specified data in the non-volatile memory die;
in response to the second command, appending or prepending the die temperature information from the die temperature buffer to the specified data read from the non-volatile memory die or to a write status response in a response to the second command; and
sending the second response to the second command.

10. The method of claim 9 further comprising determining by a hand-shake routine between the non-volatile memory die and a controller that the non-volatile memory die is configured to send the die temperature information together with command responses to the controller.

11. The method of claim 9 further comprising, in response to the second command, sending a die variable identifier to identify a type of information included in the second response to the second command as die temperature information.

12. The method of claim 11 further comprising:
receiving at a controller coupled to the non-volatile memory die the response to the second command, the die temperature information, and the die variable identifier;
parsing the response to the second command, the die temperature information, and the die variable identifier;
identifying information included in the die temperature information as temperature information from the die variable identifier; and
managing operation of the non-volatile memory die according to the die temperature information.

13. The method of claim 9 further comprising:
measuring a temperature of the non-volatile memory die; and
storing the temperature of the non-volatile memory die in the die temperature buffer.

14. The method of claim 9 wherein the first command further includes a number to indicate how many times die temperature is to be sent with responses.

15. A memory system, comprising:
a controller configured to send an initialization command to a non-volatile memory die to initialize editing, by die control circuits of the non-volatile memory die, one or more responses to one or more read or write status commands from the controller to include die variable information related to operation of the non-volatile memory die that is not indicated by the one or more read or write status commands, the controller configured to send the one or more read or write status commands to the non-volatile memory die, parse the one or more responses to the read or write status commands to obtain the die variable information added by the die control circuits, and manage operation of the non-volatile memory die according to the die variable information.

16. The memory system of claim 15 wherein the controller is further configured to include in the initialization command one or more die variable identifiers to identify one or more types of die variable information to be added by the non-volatile memory die.

17. The memory system of claim 16 wherein the controller is further configured to include in the initialization command a number to indicate to the non-volatile memory die a finite or infinite number of times to add the die variable information to responses to die access command and to send a command subsequent to the initialization command to terminate or modify adding the die variable information prior to reaching the number.

18. The memory system of claim 16 wherein the controller is configured to include a die temperature identifier in the initialization command to identify die temperature as a die variable to be included in edited responses to the one or more read or write status commands.

19. A memory system, comprising:
a non-volatile memory die, the non-volatile memory die including:
means for storing die temperature information including temperature at one or more locations on the non-volatile memory die;
means for appending or prepending the die temperature information to one or more responses to one or more read or write status commands, the one or more read or write status commands not including a die temperature request; and
a controller connected to the non-volatile memory die and configured to send an initialization command to the non-volatile memory die to initialize appending or prepending the die temperature information to the one or more read or write status commands, receive the responses to the one or more read or write status commands including the die temperature information, and to use the die temperature information to manage operation of the non-volatile memory die.

20. The memory system of claim 19 wherein the non-volatile memory die further includes:
means for counting a number of times die temperature information is added to responses to die access commands and comparing a counted number of times with a predetermined number.

* * * * *